US011763369B2

(12) United States Patent
Moussaffi

(10) Patent No.: US 11,763,369 B2
(45) Date of Patent: *Sep. 19, 2023

(54) SYSTEM AND METHOD FOR REDUCING SIMILAR PHOTOS FOR DISPLAY AND PRODUCT DESIGN

(71) Applicant: Shutterfly, LLC, Redwood City, CA (US)

(72) Inventor: Omer Moshe Moussaffi, Haifa (IL)

(73) Assignee: Shutterfly, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,860

(22) Filed: Aug. 10, 2022

(65) Prior Publication Data
US 2023/0079740 A1    Mar. 16, 2023

Related U.S. Application Data

(63) Continuation of application No. 16/994,273, filed on Aug. 14, 2020, now Pat. No. 11,443,469, which is a continuation-in-part of application No. 15/716,832, filed on Sep. 27, 2017, now Pat. No. 10,762,126.

(51) Int. Cl.
| | |
|---|---|
| *G06K 9/68* | (2006.01) |
| *G06Q 30/0601* | (2023.01) |
| *G06T 11/60* | (2006.01) |
| *G06F 16/51* | (2019.01) |
| *G06F 18/22* | (2023.01) |
| *G06V 10/74* | (2022.01) |
| *G06V 40/16* | (2022.01) |

(52) U.S. Cl.
CPC ......... *G06Q 30/0621* (2013.01); *G06F 16/51* (2019.01); *G06F 18/22* (2023.01); *G06Q 30/0643* (2013.01); *G06T 11/60* (2013.01); *G06V 10/761* (2022.01); *G06T 2200/24* (2013.01); *G06V 40/161* (2022.01); *G06V 40/172* (2022.01)

(58) Field of Classification Search
CPC ..... G06T 11/60; G06T 2200/24; G06F 16/51; G06F 16/54; G06K 9/6215; G06Q 30/0621; G06Q 30/0643; G06V 40/161; G06V 40/172
USPC ........................................................ 382/218
See application file for complete search history.

(56) References Cited

U.S. PATENT DOCUMENTS

| | | |
|---|---|---|
| 8,352,494 B1 | 1/2013 | Badoiu |
| 10,762,126 B2 | 9/2020 | Moussaffi |
| 11,443,469 B2 | 9/2022 | Moussaffi |
| 2009/0208097 A1 | 8/2009 | Husseini |

(Continued)

*Primary Examiner* — Stephen P Coleman
(74) *Attorney, Agent, or Firm* — Merchant & Gould P.C.

(57) ABSTRACT

A photo design smart assistant system for reducing similar photos for display and product design includes a similarity distance computation module that can calculate hash values of images and to calculate similarity distances between the images using at least the hash values, a burst grouping module that can automatically group the images into a burst based at least in part on the similarity distances of the images, wherein at least one image is automatically selected from the burst of images, an intelligent design creation engine that can automatically create a photo product design using the selected image from the burst, and a printing and finishing facility that can automatically make a physical photo product based on the photo product design.

20 Claims, 9 Drawing Sheets

(56) References Cited

U.S. PATENT DOCUMENTS

| | | |
|---|---|---|
| 2010/0094441 A1 | 4/2010 | Mochizuki |
| 2011/0169982 A1 | 7/2011 | Yamakawa |
| 2011/0206275 A1 | 8/2011 | Takahashi |
| 2012/0141023 A1 | 6/2012 | Wang |
| 2014/0198986 A1 | 7/2014 | Marchesotti |
| 2014/0218353 A1 | 8/2014 | Solem |
| 2015/0178786 A1* | 6/2015 | Claessens .......... G06Q 30/0277 |
| | | 705/14.66 |
| 2016/0093083 A1 | 3/2016 | Chen |
| 2016/0188997 A1 | 6/2016 | Desnoyer |
| 2017/0177942 A1 | 6/2017 | Rao |
| 2019/0007476 A1 | 1/2019 | Rabbat |

* cited by examiner

SYSTEM AND METHOD FOR REDUCING SIMILAR PHOTOS FOR DISPLAY AND PRODUCT DESIGN

CROSS-REFERENCE TO RELATED APPLICATION(S)

This application is a Continuation of U.S. application Ser. No. 16/994,273, filed on Aug. 14, 2020, which is a Continuation-In-Part of U.S. application Ser. No. 15/716,832, U.S. Pat. No. 10,762,126, filed on Sep. 27, 2017, and issued on Sep. 1, 2020, the disclosures of which are hereby incorporated by reference in their entireties. To the extent appropriate, a claim of priority is made to each of the above-disclosed applications.

TECHNICAL FIELD

This application relates to digital imaging technologies, and in particular, to technologies that assist photo displays and photo product designs.

BACKGROUND OF THE INVENTION

With the advancement of consumer electronic devices, a vast number of pictures are taken by mobile devices and digital cameras every day. Digital images can be viewed on devices, shared over computer networks, and incorporated into designs for photo products.

Handling large number of digital images is a challenge to photographers, and has become an obstacle to the images' utilizations. As mobile phones and digital cameras have made photo taking very convenient, people often snap many pictures of the same scene at each moment especially if it is a special occasion. These pictures tend to be very similar to each other, comprising the similar backgrounds with the same people having similar facial expressions. The current image software usually displays all the captured images on devices, which can be overwhelming for viewing, editing, and using in product design or electronic sharing. Users have to carefully compare these similar photos, remove most of them, and keep one or a few for display for each set of people at each scene. Since people's facial expressions often only have minute differences between them, it is extremely hard to tell these photos apart even with examining at image magnifications. Trimming photos have become a time-consuming task for most photographers.

Similarly, photo products such as photobooks are often segmented by a series of scenes and activities in an occasion or a story such as a vacation, a trip, or a project. Typically, users only need one to a few photos for each set of people at each scene. Again, curating the photos in the context of a design style and layouts can be very time consuming.

There is therefore an immediate need for assisting photographers to sort, organize, and reduce numbers of photos to make their photo experiences in viewing and creative designs more enjoyable and less time consuming.

SUMMARY OF THE INVENTION

The present application discloses a system and a method that can significantly enhance users' experiences associated with view photos and designing personalized photo products. Automated tools have been developed to quantify the degree of similarities between photos and group the similar photos into bursts, each of which usually taken at a same moment at the same scene. The disclosed method groups images into burst based on not only image time or locations, but also image content, and image context. Moreover, the disclosed method can effectively identify both duplicate images (with different names and after editing and processing) as well as similar images. The automated tools then select one or a few best photos from each burst for display or for incorporating into an electronic publication or share, or into a photo product design.

The disclosed system and method can effectively simplify and declutter presentations of photos on user devices. The disclosed system and method can drastically decrease the time and effort that users spend in managing, organizing, and utilizing their digital images. The processes of photo viewing, photo sharing, and photo design creation are made much more enjoyable. The disclosed system and method can be integrated with intelligent design tools for creating photo products and electronic sharing. In sum, the present invention can help people better preserve and share their precious memories.

In one general aspect, the present invention relates to a computer-implemented method for reducing similar photos for display and product design, including calculating hash values of images by a similarity distance computation module in a computer system; calculating similarity distances between the images using at least the hash values by a similarity distance computation module in the computer system; automatically grouping the images into a burst based at least in part on the similarity distances of the images by a burst grouping module in the computer system; automatically selecting at least one image from the burst of images; automatically creating a photo product design using the selected image from the burst by an intelligent design creation engine in the computer system; and automatically making a physical photo product based on the photo product design.

Implementations of the system may include one or more of the following. The step of calculating similarity distances can include automatically calculating a Hamming Distance between the hash values of the two images. The images having their Hamming Distance at or smaller than a burst threshold value can be grouped into a same burst by the burst grouping module. The hash values can each has 64 bits, wherein the burst threshold value can be 4. The step of calculating similarity distances can further include calculating color densities, edge orientations, and edge densities between two images. The hash values of images can be calculated by a hashing method including pHash, RadialHash, or Wavelet-based hash. The computer-implemented method can further include sequencing the images in a chronological sequence if the images have available image times, wherein the similarity distances are calculated between adjacent images in the chronological sequence. The images can be grouped into a burst by a burst grouping module based further on image capture times and image capture locations. The images can be automatically grouped into the burst further based on image compositions, facial expressions, orientations of the faces, sizes of the faces, light exposures of the faces and persons in the image, importance of person(s) in the image, scene composition, dominant colors, color histograms, block color histograms, and cloth colors and patterns. At least one image can be automatically selected from the burst of images based on detection of faces, faces recognized presence of faces of family and close friends, or positions and focus of the faces in the image. The computer-implemented method can further include automatically selecting a product type, a product layout, or a product style for the photo product design by the intelligent design creation engine. The computer-implemented method can further include automatically selecting a product type, a product layout, or a product style for the photo product design based on a user's social data by the intelligent design creation engine. The computer-implemented method can further include companion images in a burst is automatically presented by the intelligent design creation engine for user selection of a different image from the burst in the photo product design or the photo display. The computer-implemented method can further include automatically displaying the selected image from the burst on a device by the intelligent design creation engine. The computer-implemented method can further include designating a first image as a duplicate image if a similarity distance between the first image and a second image is below a duplicate threshold value. The duplicate threshold is smaller than the burst threshold. The duplicate image can be discarded before the step of selecting. The computer-implemented method can further include designating a first image as a new image if a similarity distance between the first image and other images is above the duplicate threshold value.

In another general aspect, the present invention relates to a photo design smart assistant system for reducing similar photos for display and product design, which includes a similarity distance computation module that can calculate hash values of images and to calculate similarity distances between the images using at least the hash values; a burst grouping module that can automatically group the images into a burst based at least in part on the similarity distances of the images, wherein at least one image can automatically be selected from the burst of images; an intelligent design creation engine that can automatically create a photo product design using the selected image from the burst; and a printing and finishing facility that can automatically make a physical photo product based on the photo product design.

These and other aspects, their implementations and other features are described in detail in the drawings, the description and the claims.

DETAILED DESCRIPTION OF THE INVENTION

Figure 1:
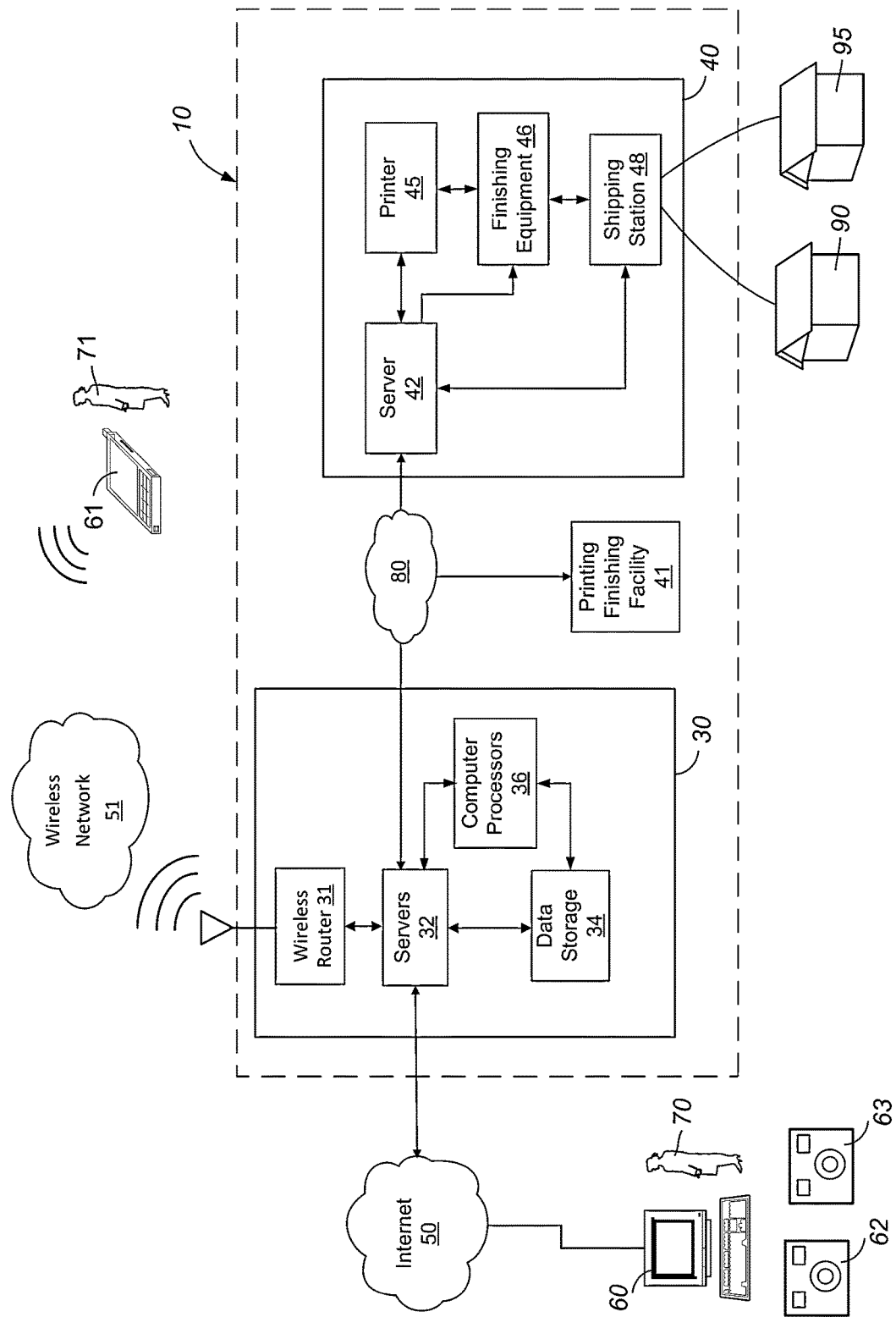
FIG. 1 is a block diagram of a network-based system for creating designs of personalized photo product and electronic sharing in accordance with the present invention.

Referring to FIG. 1, a network-based imaging service system 10, which can be operated by an image service provider such as Shutterfly, Inc., includes a data center 30 and one or more product fulfillment centers 40, 41 in communication with the data center 30 over a computer network 80. The network-based imaging service system 10 allows users 70, 71 to organize and share images via a wired network or a wireless network 51, create photo product designs, and order personalized photo products based on the product designs. The product fulfillment centers 40, 41 manufacture and ship the ordered photo products to recipients.

The data center 30 includes one or more servers 32 configured to communicate with user devices 60, 61 operated by users 70, 71 on the web or via mobile applications, a data storage 34 for storing user data, image and design data, and product information, and computer processors 36 for rendering images and product designs, analyzing and organizing images, and analyzing and understanding user behaviors and preferences.

The users 70, 71 can view, edit, organize, and share images, and create designs and order personalized photo products using a mobile application or a browser by accessing the website. Images can also be uploaded from a mobile device 61 or a computer device 60 to the server 32 to allow the user 70 and stored at the data center 30. The images or videos stored in the data storage 34, the computer device 60, or the mobile device 61 usually include photos or videos taken at different events and occasions. If users 70, 71 are members of a family or a group (e.g. a soccer team), the images from the cameras 62, 63 and the mobile device 61 can be grouped together to be incorporated into a photo product such as a photobook, or used in a blog page for an event such as a soccer game.

The users 70, 71 can order physical products based on the photo product designs, which can be manufactured by the printing and finishing facilities 40 and 41. The recipients receive the physical product with messages from the users at locations 90, 95. The recipients can also receive digital versions of the photo product designs over the Internet 50 and/or a wireless network 51.

In the present disclosure, the term "personalized" (or "individualized" or "customized") refers to content such as photos, text, design elements, layouts, or styles that is specific to a user, a recipient, a gift product, or an occasion. A photo product can include a single page or multiple pages. Each page can include one or more images, text, and design elements positioned in proportions in a particular layout. Examples of personalized photo products include photobooks, personalized greeting cards, photo stationeries, photographic prints, photo posters and photo banners, photo banners, photos on canvas, art prints, framed prints, photo décor, duvet, photo bags, photo playing cards, photo T-shirts, photo mugs, photo aprons, photo magnets, photo mouse pads, photo phone cases, tablet computer cases, photo key-chains, photo collectors, photo coasters, or other types of photo gifts or novelty items. Photobooks can be in the forms of image albums, scrapbooks, bound photo calendars, or photo snap books, etc.

Figure 2:
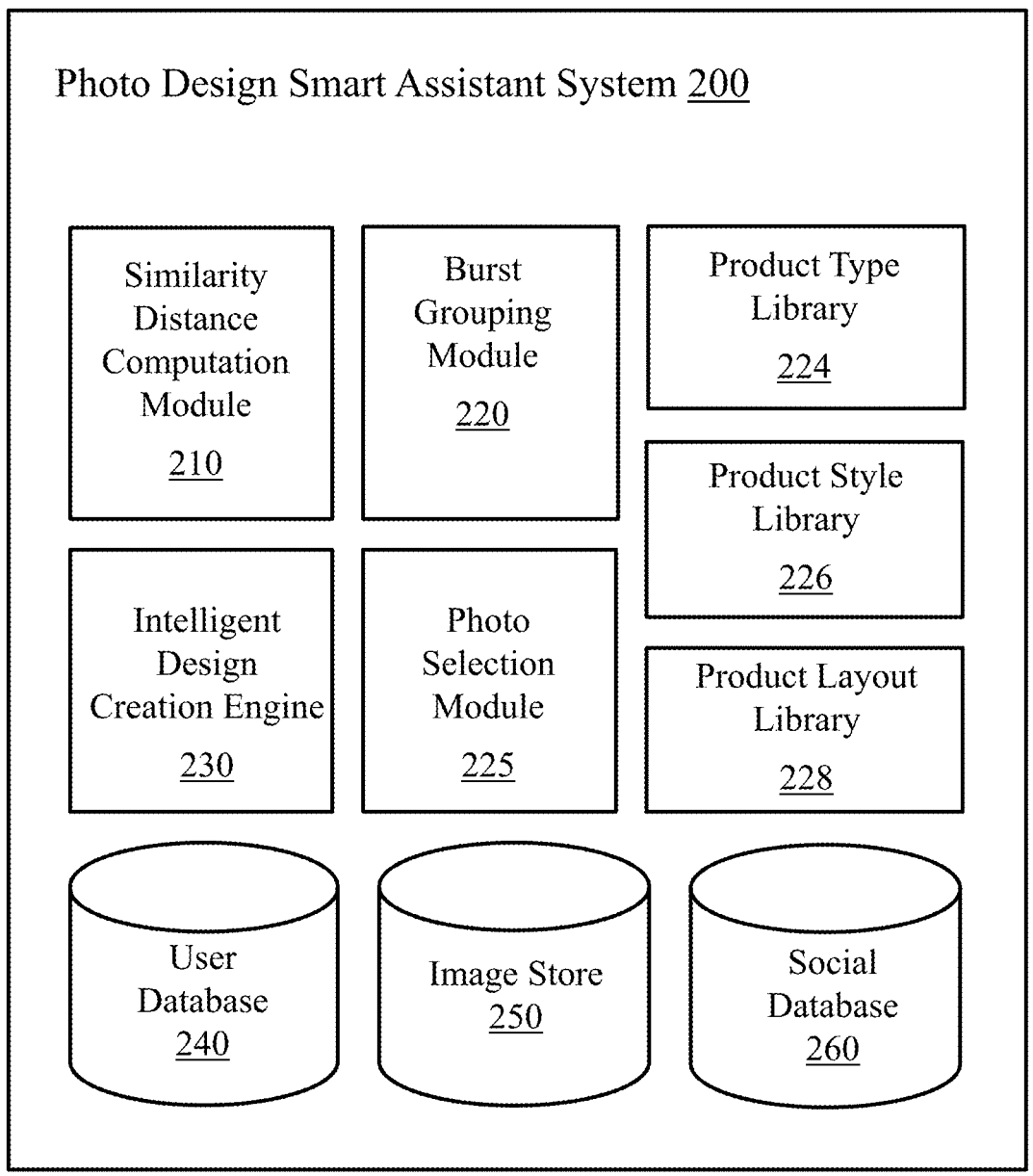
FIG. 2 is a block diagram of a smart assistant system that enables users to create designs for photo products and electronic sharing in accordance with some embodiments of the present invention.

In some embodiments, referring to FIGS. 1 and 2, a photo design smart assistant system 200 is provided to help users to organize their photos, and simplify their photo viewing and photo creations. The photo design smart assistant system 200 includes a similarity distance computation module 210, a burst grouping module 220, a photo selection module 225, and an intelligent design creation engine 230.

As discussed in detail below, the similarity distance computation module 210 is configured to calculate the similarity values between photos. In the present disclosure, the degree of similarity between photos can be quantified by a numerical distance, which can be used as a measure to define and group photos that are similar. First, each image is hashed to obtain a hash value, which specifically represents the image. Next, a similarity distance is calculated between two images using at least in part the hash values of the two images. In one implementation, the similarity distance is obtained by calculating Hamming Distance between the hash values of the two images.

Figure 3A:
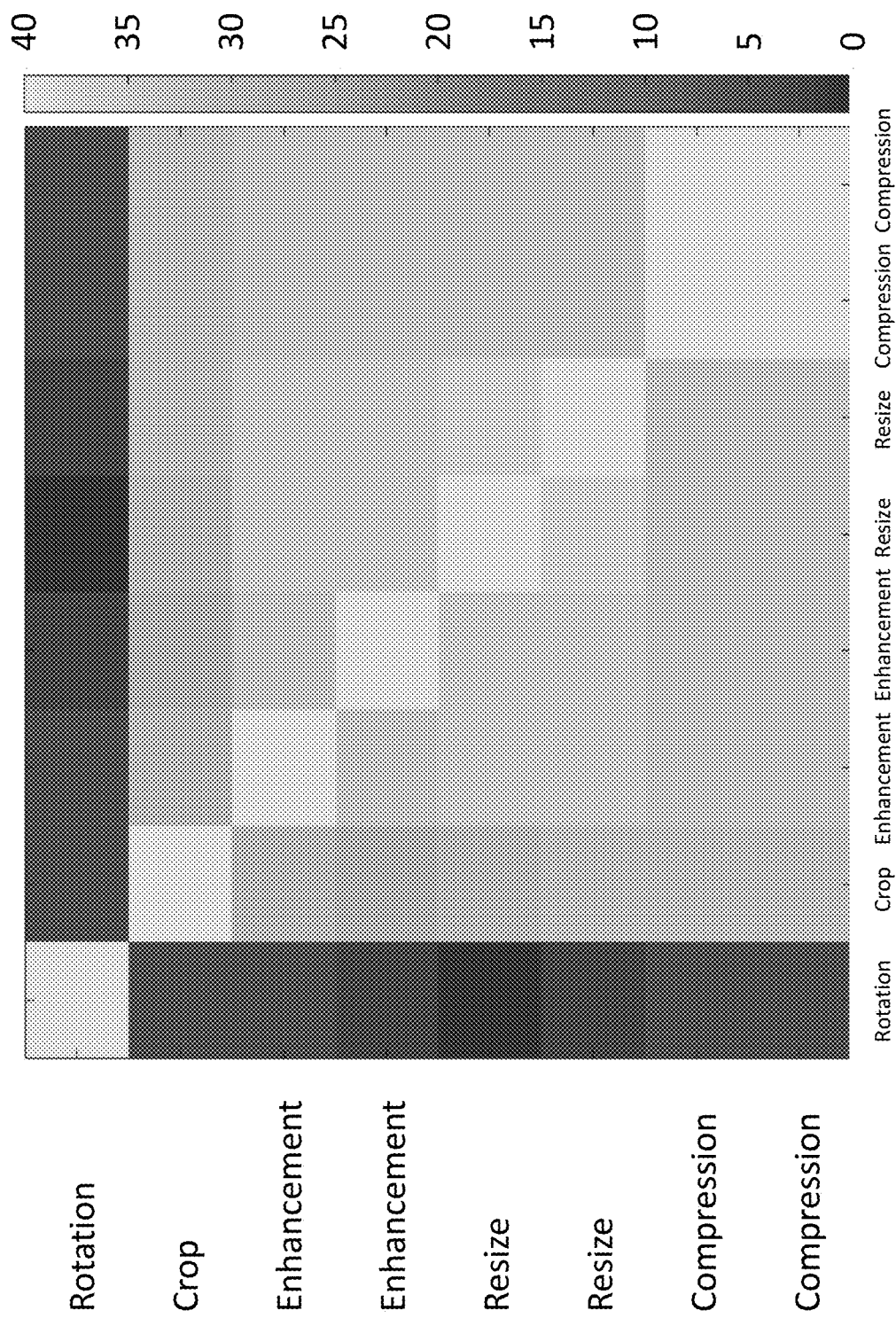
FIG. 3A illustrate a reverse similarity distance between images processed by various operations from the same original image in accordance with some embodiments of the present invention.

This disclosed method and system are compatible with different hashing methods can be implemented. For example, pHash, Radial-Hash, Wavelet-based hash, etc. pHash and other image-hash algorithms replace an image with an n-byte signature, which is almost unique. The signature is usually derived from multi-resolution analysis of the image in question followed by statistical extraction of relevant pixel data, and is designed such that comparison of hash signatures is mathematically trivial. The feasibilities of different hash algorithms have been tested by analyzing the Hamming Distance between processed images obtained by processing a same original image with different operations such as compression, resizing, enhancement, cropping, and rotation. FIG. 3A shows reverse similarity distances are calculated between pairs of images obtained by processing a same image with different image operations. The reverse similarity distances are expressed in a scale of 40 minus Hamming Distance between hash values obtained by a pHash algorithm (a DCT based pHash algorithm). The results show that similarity distances between different pairs of processed images originating from the same image remain small except for the rotated images. Since most of photographers' images taken in a burst maintain orientations throughout the burst series, the disclosed method is an effective and low-computation tool to quantitatively measure similarities between images.

Figure 3B:
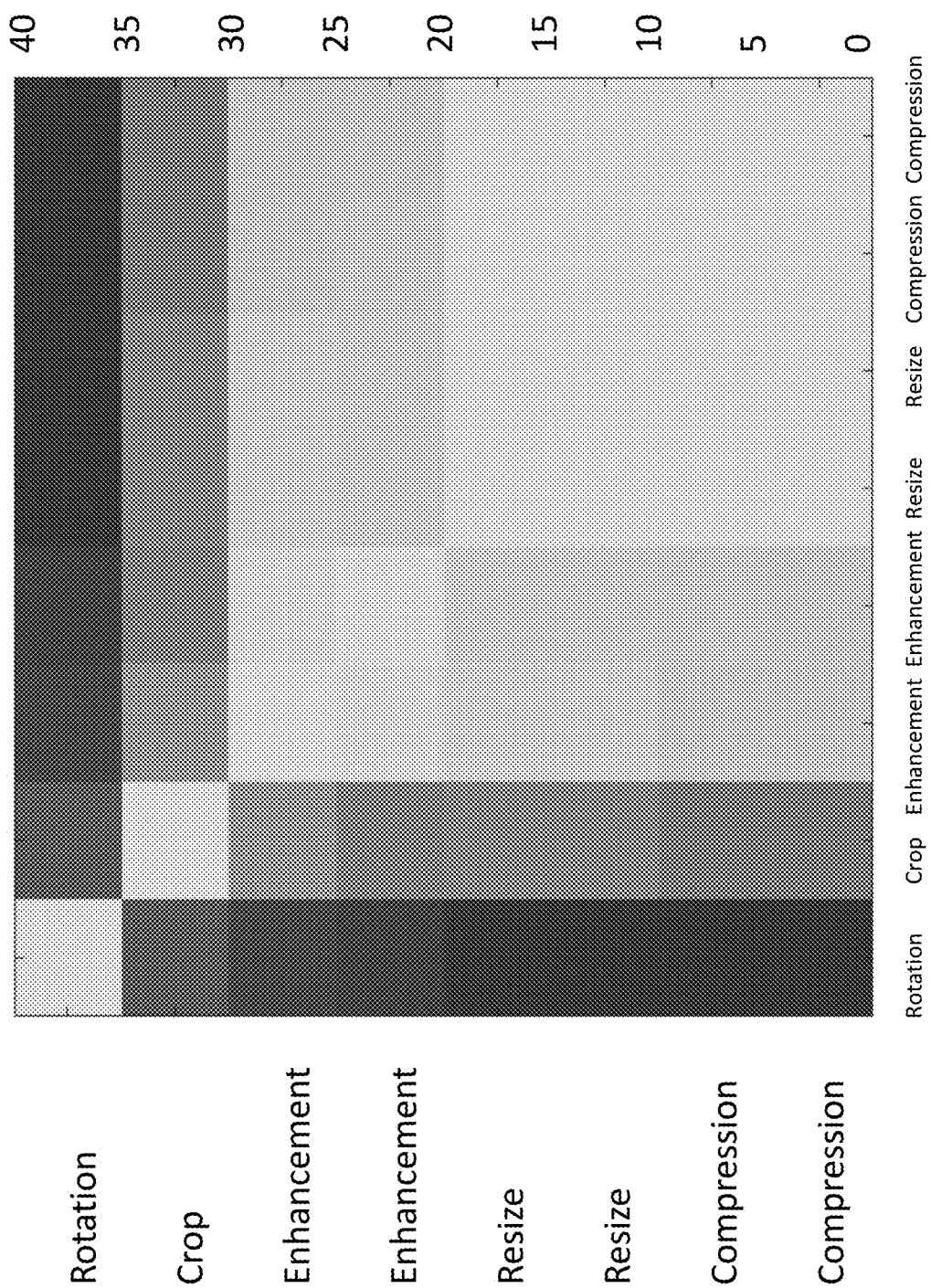
FIG. 3B further illustrates the reverse similarity distance between images processed by various operations from the same original image in accordance with some embodiments of the present invention.

In another example, as shown in FIG. 3B, hash values are obtained from processed images using a Radial-Hash algorithm. Reverse similarity distances are calculated between pairs of images obtained by processing a same image with different image operations. The reverse similarity distances are expressed in a scale of 40 minus Hamming Distance between the hash values. Again, the results show that similarity distances between different pairs of processed images originating from the same image remain small except for the rotated images.

In some embodiments, in addition to Hamming Distance of hash values, the similarity distances can also depend on differences in color densities, edge orientations, and edge densities between two images. The similarity distance can be a function of the weighted differences in different metrics: Hamming Distance of hash values, differences in color densities, edge orientations, and edge densities, etc.

Experiments employing the above described hashing and similarity distance calculations have been shown to work well in automatically identifying similar images.

The burst grouping module 220 sorts and groups photos into bursts based on the numerical distances between photos obtained by the similarity distance computation module 210. Specifically, photos having their numerical distance smaller than a predetermined threshold value can be considered as similar and are placed into a same burst. Photos having their numerical distance larger than a predetermined threshold value are assigned to different bursts. For example, 64-bit hash values can be computed from images using DCT-pHash. The maximum Hamming Distance between the hash values of different images is 64. The threshold can be set at 4, that is, images having Hamming Distance smaller or equal to 4 are considered to be similar and belong to the same burst.

It should be noted that he disclosed method groups images into burst based not only on image time or on image locations, but also based on image content and image context. Moreover, the disclosed method can effectively identify both duplicate images (with different names and after editing and processing) as well as similar images that look indiscernible to human eyes. For example, the threshold for the similarity distances between two images can be adjusted to identify duplicate images specifically. For instance, a threshold of 2 for Hamming Distance between hash values of two images can be used as a criterion for determining duplicate images.

Aside from the similarity distances, the grouping of image bursts can also be based on image times and image capture locations. As described above, if available, image times can be used to sequence the images before calculating similarity distances. In most cases, similar images in a burst are taken within a short interval and at the same location. Then a maximum time limitation can be applied in the process of identifying images in a burst. Other criteria and metrics for grouping images into bursts can include: positions and balance of the persons and objects, locations of the faces, sizes of the faces, the importance of the persons in the image (based on the social data (stored in 260), scene composition, dominant colors, color histograms, block color histograms, and cloth colors and patterns of the persons in the image.

The photo selection module 225 is configured to select one, a couple of, or a few photos in each burst. The images are scored based on a few criteria: detection of faces, faces recognized, and the presence of VIP faces (e.g. family and close friends) in the image; the estimated focus of the faces; face positions; image quality such as image focus, color balance, and light exposures. Image scoring can also depend on facial expressions: for example, more preferred images include smiling faces, faces with open eyes, faces having moderate light exposures (rather than over exposed or under exposed, etc.). The image selection can also depend on image quality parameter such as sharpness and light exposure. Images in a burst are then selected based on the image scores.

The photo design smart assistant system 200 also includes a product type library 224, a product style library 226, and a product layout library 228, which respectively stores types of events, product styles, and product layouts for personalized photo products and for electronic shares.

The intelligent design creation engine 230 can automatically display the selected photos from different bursts at a user interface on a device or automatically incorporate the selected photos into a design for a photo product or for an electronic share. Moreover, the intelligent design creation engine 230 creates the designs for photo products or for electronic shares based also in part on the product types, the product layouts, and the product styles respectively stored in the product type library 224, the product style library 226, and the product layout library 228.

The product type library 224 stores the types of physical photo products such as photobooks, personalized greeting cards, photo stationeries . . . etc. described above. The product type library 224 can also store types of electronic shares such as digital images embedded on attached to emails or text messages, blogs, pages on photo share sites or social networks, chat applications for photo sharing, etc.

Product styles and product layouts include lists of pre-stored styles and layouts, and can also include those styles and layouts that are dynamically generated by the photo design smart assistant system 200.

In the present disclosure, "product style" refers to product style parameters such as a background pattern, a background photo, or a background color, embellishments, tilt angles of the photos or photo wells, the color scheme, or other design themes, characteristics, topics or elements of a photo product. For photo products, product styles also include the level of designs and curation levels. The level of designs refers to the extra design elements beyond photos incorporated in a photo product. For example, at a low level of design, a photo book may include mostly pictures and not much other design elements (e.g. a plain photo book or photo card). The curation level refers to the degree of selection and trimming of available photos in a photo collection related to the photo product. At a low curation level, all or most of the photos taken at an event can be used in a photo product such as a photo book. At a high curation level, only a small fraction of photos taken at an event is selected to be incorporated by a photo product. Sometimes a set of style parameters can be formulated together to present a theme such as fun, summer, modern, romantic, etc. Product style parameters are defined and stored in the product style library 226.

In the present disclosure, "product layout" (including page layout) refers to product layout parameters such as the number, the density, the sizes, the positions of photos on one or two opposing pages, the gaps between the photos, and the margins between photos and the edges of a page. The product layout parameters can also include the presence or absence, positions sizes, and font types of text and other design elements. Product layout parameters are defined and stored in the product layout library 228.

The photo design smart assistant system 200 can also include a user database 240, an image store 250, and a social database 260. The user database 240 stores user data such as account information, discount information, order information, relationship, and important dates associated with users. The image store 250 stores users' photos or stock photos managed by the online image service provider. The social database 260 stores relationships (family members and friends) of a user, and face images and face models for the family members and the friends of the user.

The intelligent design creation engine 230 can create designs for photo products such as a product type, a product layout, or a product style, also based in part on the user data, and social data stored in the user database 240 and the social database 260. or for electronic shares The photo design smart assistant system 200 can be formed by the servers 32, the data storage 34, and the processor 36 in the data center 30 (FIG. 1), and can employ additional distributed computing equipment, including downloaded application on user devices (60, 61). In some embodiments, the photo design smart assistant system 200 can be implemented in the cloud or with dedicated physical network equipment.

Figure 4:
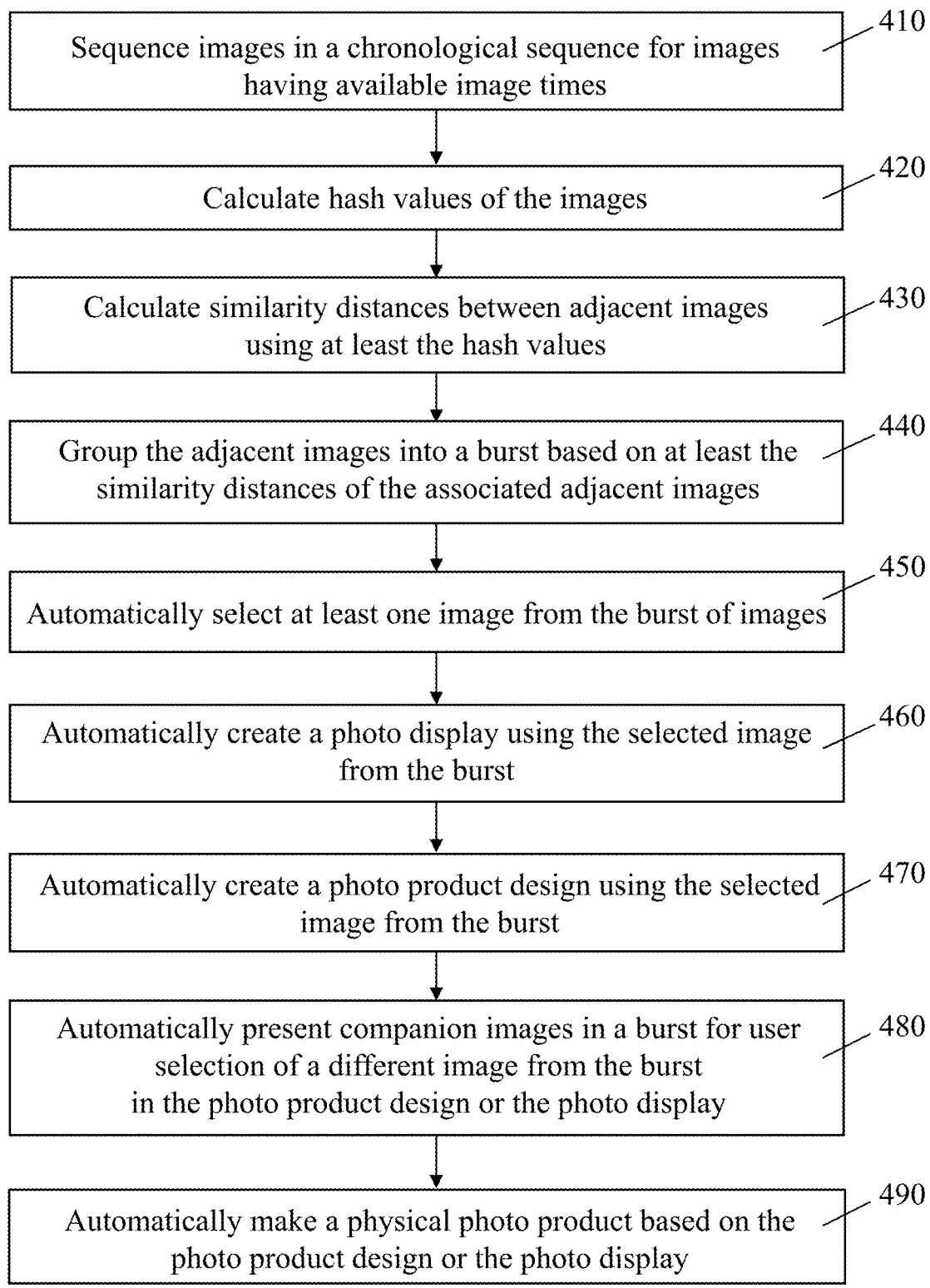
FIG. 4 is a flow diagram for automatically quantifying similarity distances between photos and grouping the photos based on the similarity distances to be selected for photo utilizations in accordance with some embodiments of the present invention.
Figure 5:
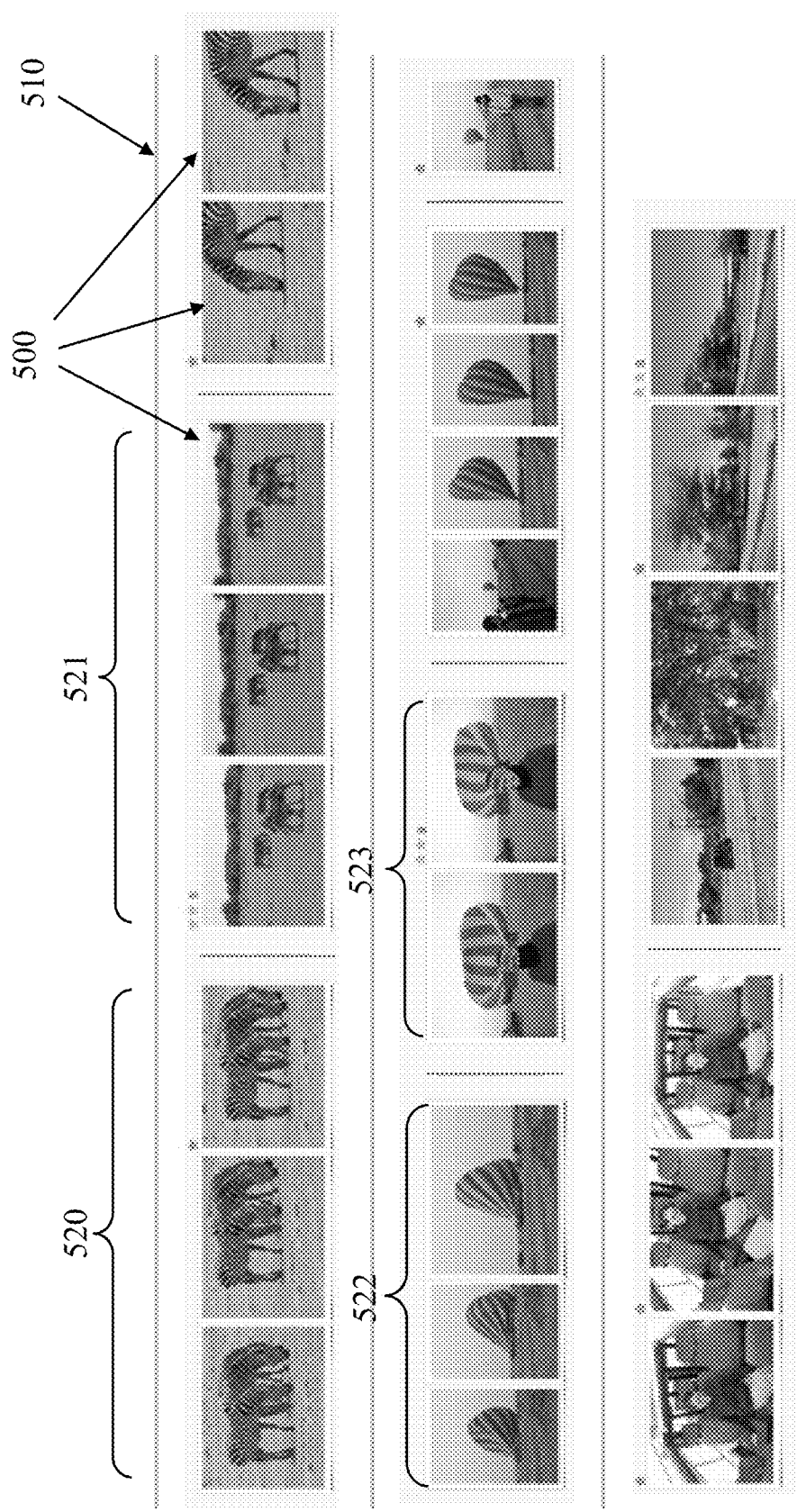
FIG. 5 illustrates bursts of similar photos at a user interface.

Referring next to FIG. 4 and FIGS. 1-2, images that have available image times are sequenced in a chronological sequence (step 410) by a computer system (e.g. the data center 30, user devices 60, 61, or the intelligent design creation engine 230). The available image times are usually the times at which the images are captured, but sometime can include upload times. For examples, images 500 at a user interface 510 shown in FIG. 5 are sequenced chronologically based the associated image times. The step 410 can be skipped for images whose image times are unknown.

Next, hash values of the images are calculated (step 420) by the similarity distance computation module 210. As described above, one of several hash algorithms can be used to conduct this operation. The similarity distances between images are calculated using at least the hash values (step 430) by the similarity distance computation module 210. For example, Hamming Distance can be calculated between the hash values of the two images to obtain similarity value between the two images. For images that have available image times, the similarity distances are calculated between adjacent images in the chronological sequence.

The adjacent images are then grouped into a burst based on at least the similarity distances of the associated adjacent images (step 440) by the burst grouping module 220. The images can be grouped into a burst if the associated similarity distances of the images are below a burst threshold value. FIG. 5 shows image bursts 520-523, each of which includes images taken rapidly at the same scene in a sequence. The images within each burst 520-523 are very similar to each other. The images can be taken by one or more devices, for example by family members who took pictures at the same event. As described above, the grouping of image bursts can be based on several criteria such as image quality, the image composition, significance of the persons in the images, etc.

Figure 6:
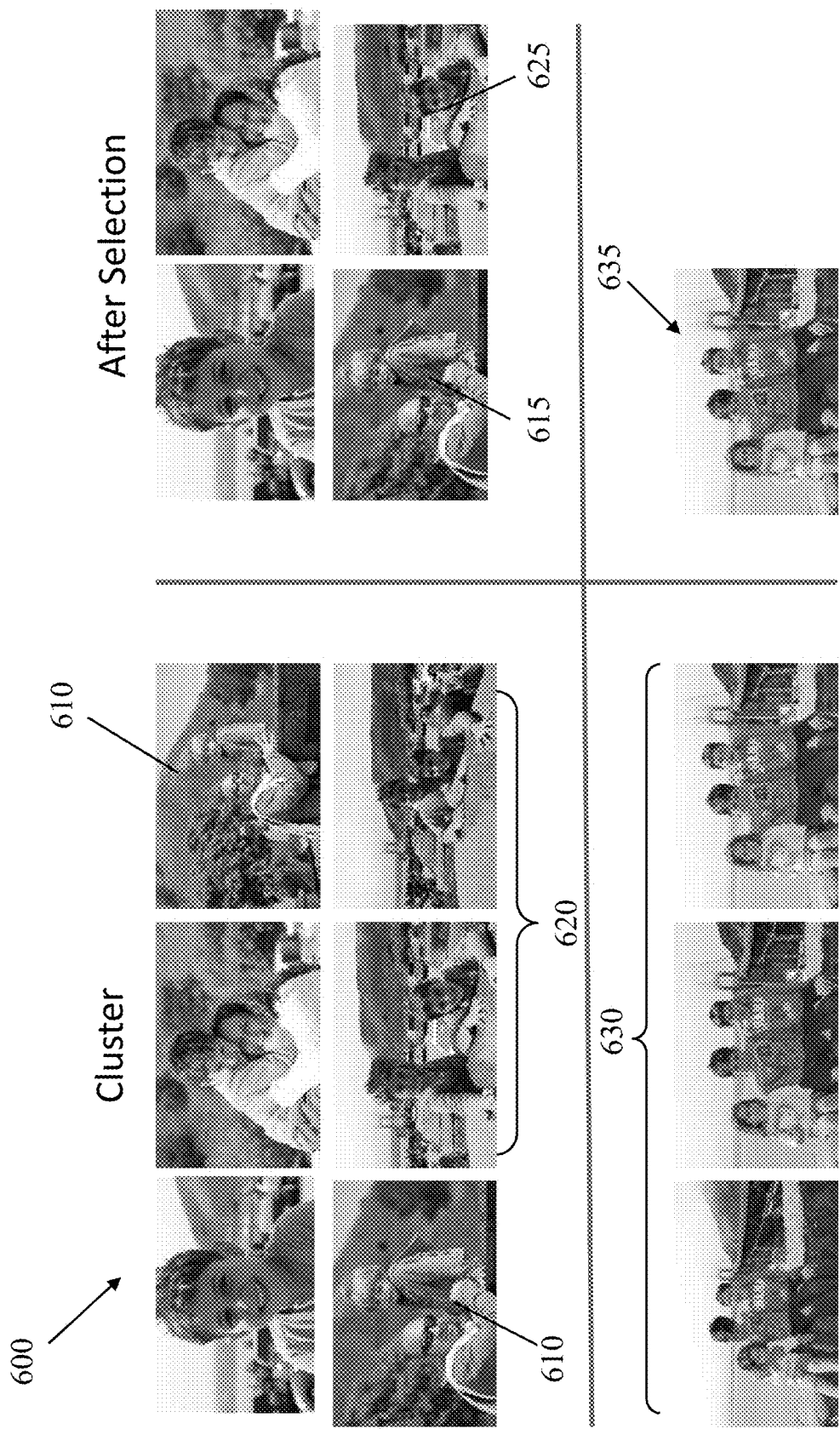
FIG. 6 illustrates a user interface showing a user's photos before and after decluttering by the disclosed system and method.

At least one image is automatically selected from the burst of images (step 450) by the burst grouping module 220. A photo display is automatically created using the selected image from the burst (step 460) by the intelligent design creation engine 230. Referring to FIG. 6, a user interface 600 includes images before the selections on the left and after the selections on the right. Several bursts 610, 620, 630 displayed on the left. Images 615, 625, 635 are selected respectively from the bursts 610, 620, 630 by the burst grouping module 220, and are displayed with other images on the right. As shown in FIG. 6, the images after selection are less cluttered than before the selections. It should be noted that FIG. 6 is used for illustration purpose. In real applications, an image burst can include dozens of images; there can be a much bigger reduction in image numbers than illustrated in FIG. 6.

Figure 7:
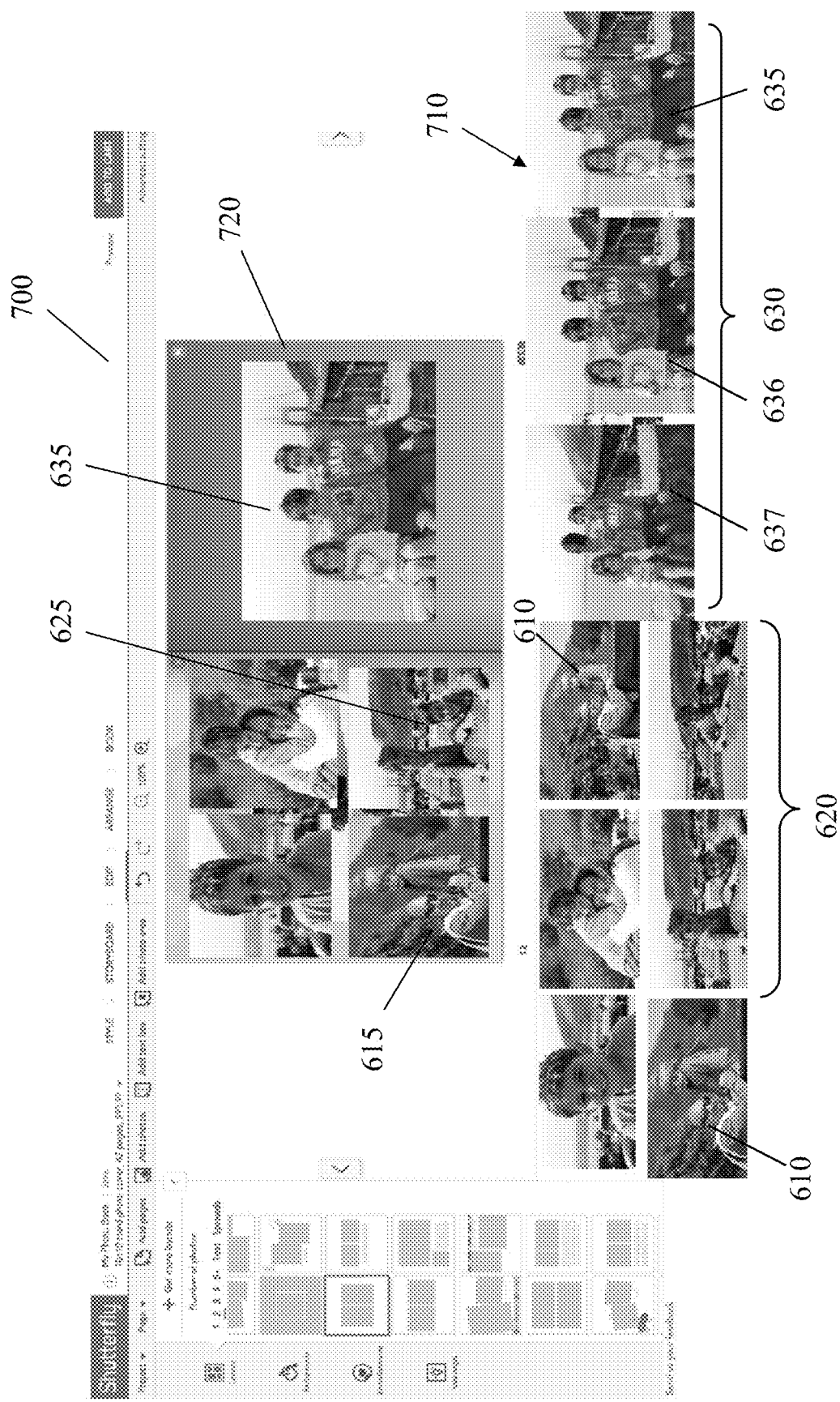
FIG. 7 illustrates a user interface showing the automatic clustering of photos based on similarity calculation and automatic selections of photos to be placed in a photo product design in accordance with some embodiments of the present invention.

A photo product design is automatically created using the selected image from the burst (step 470) by the intelligent design creation engine 230. The intelligent product creation engine 230 can develop a design theme (e.g. fun, summer, modern, romantic, etc.) based user data and social data stored in the user database 240 and the social database 260. The intelligent product creation engine 230 can also choose a product type, product layout parameters, the product style parameters using information in the product type library 224, the product style library 226, and the product layout library 228. As shown in FIG. 7, a user interface 700 includes an image collection 720, and a photo product design 720 automatically created by the intelligent design creation engine 230. The image collection 720 includes the bursts 610, 620, 630 shown previously in FIG. 6. The selected images 615, 625, 635 are automatically placed in the photo product design 720 by the intelligent design creation engine 230. Optionally, the intelligent product creation engine 230 can receive user's edit command to revise the photo product design 720.

Optionally, companion images in a burst are automatically presented by the intelligent design creation engine 230 for user selection of a different image from the burst in the photo product design or the photo display (step 480). Referring FIG. 7, when a user selects or controls a mouse over the image 635 in the photo product design 720, a window can appear to all show other images 636, 637 in the same burst 630. The user has the option to compare these images and select a different image such as the image 637 in the same burst 630. The same image change feature can also be provided in a display of the selected images, such as to the right side of the user interface 600 in FIG. 6.

After the photo product design 720 is finished, the user may order the corresponding photo product to be made. The design data is transmitted from the data center 30 to a printing and finishing facility 40 or 41. A physical photo product is automatically manufactured based on the photo product design (step 490) at the printing and finishing facility 40 or 41. Similarly, an electronic share of the selected images or the photo product design can be distributed over the network.

Figure 8:
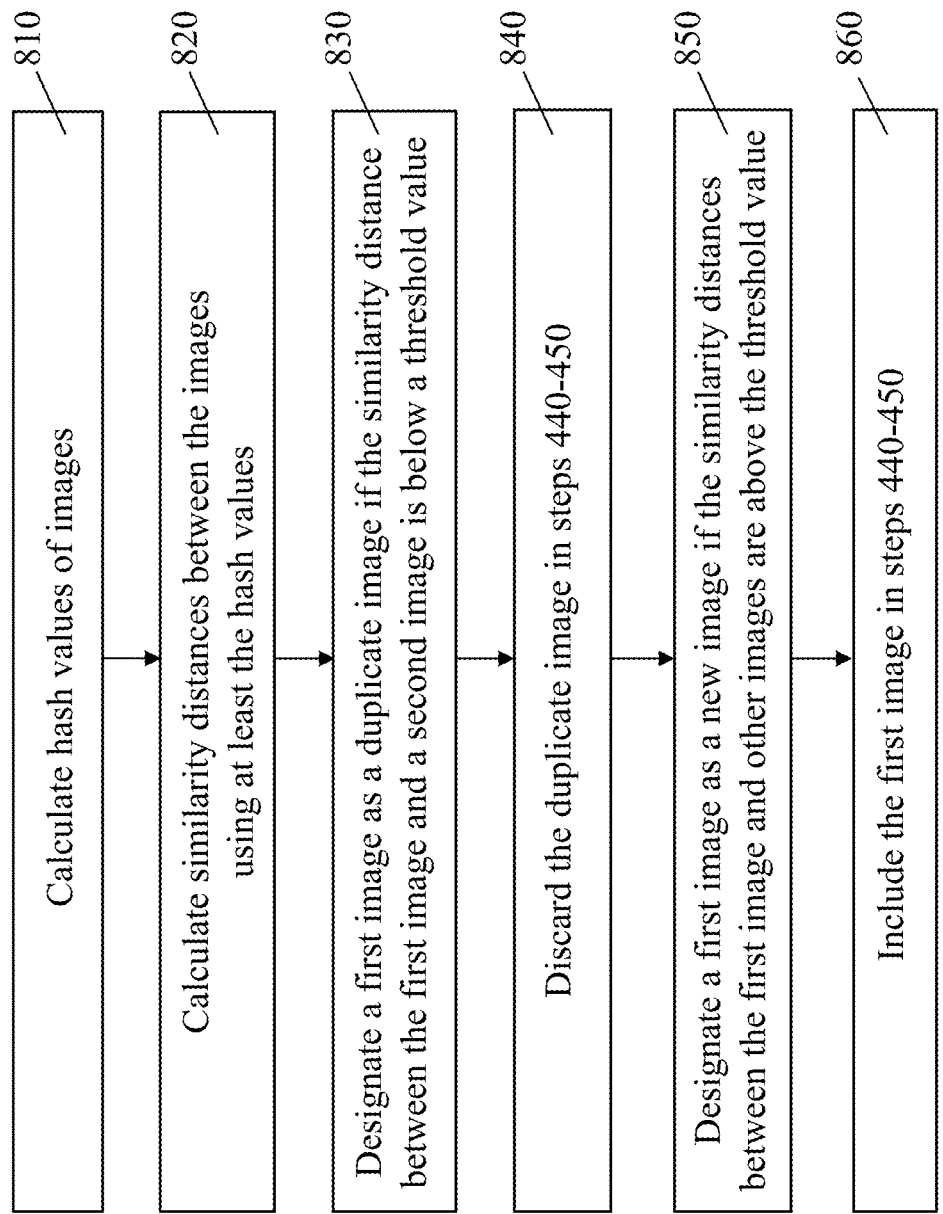
FIG. 8 is a flow diagram for removing duplicate photos based on similarity distances between photos before the photos are grouped and selected in accordance with some embodiments of the present invention.

In some embodiments, the process illustrated in FIG. 4 is extended further to include the removal of duplicated photos. Referring to FIG. 8, similar to step 420 (in FIG. 4), hash values of images are calculated (step 810). Then, similarity distances between the images are calculated based on at least the hash values (step 820), as described in relation to step 430 (in FIG. 4). If the similarity distance between a first image and a second image is below a duplicate threshold value, the first image is designated as a duplicate image (step 830) of the second image. The duplicate image (the first image or the second image) is discarded (step 840) in grouping photos into bursts and selecting the photos from the burst in steps 440-450. If the similarity distance between a first image and a second image is above the duplicate threshold value, the first image is designated as a new image (step 850). The first image is included in one of the bursts as described in steps 440-450 (step 860). The first image may be similar to the second image based on the criteria discussed above, and is assigned into a same group in step 440. The first image may also be different enough based on the discussion above and is assigned to a different burst from the second image in step 440. If the first image is selected in step 450, it can be incorporated into a photo product design (step 470) or in a photo display (step 460).

Using 64-bit hash values by DCT-pHash as an example, the maximum Hamming Distance between the hash values of different images is 64. As discussed above, the burst threshold for Hamming Distance for similar images can be 4, that is, images having Hamming Distance smaller or equal to 4 are considered to be similar and assigned to the same burst. A duplicate threshold for Hamming Distance for duplicate images can be 2, which means that images having Hamming Distance smaller or equal to the duplicate threshold are designated as duplicate. Only one of them is kept while others discarded. The duplicate threshold is smaller than the burst threshold. The similarity distances are expressed in different values in Radial-Hash and Wavelet-based hash. For example, the first and the duplicate thresholds are in percentage values in Radial-Hash.

It should be understood that the presently disclosed systems and methods can be compatible with different devices or applications other than the examples described above. For example, the disclosed method is suitable for desktop, tablet computers, mobile phones and other types of network connectable computer devices. The photo products compatible with the present invention are not limited to the examples described above.

What is claimed is:

1. A system for reducing similar photos comprising:
   a computing system comprising a processor, a similarity distance computation module, a burst grouping module, and a memory communicatively coupled to the processor, the memory storing instructions executable by the processor to:
   calculate hash values of images, wherein the images include a first image and a second image;
   calculate similarity distances between the images using at least the hash values by the similarity distance computation module;
   automatically group the images into a burst by the burst grouping module when the similarity distances of the images are below a burst threshold value;
   designate the first image as a duplicate image if a similarity distance between the first image and the second image is below a duplicate threshold value, wherein the duplicate threshold value is smaller than the burst threshold value; and
   designate the first image as a new image if similarity distances between the first image and other images in the burst are above the duplicate threshold value, wherein the new image is assigned to the burst when the similarity distances between the new image and other images in the burst are below the burst threshold value.

2. The system of claim 1, further comprising instructions executable by the processor to:
   designate the first image as a new image if similarity distances between the first image and other images in the burst are above the duplicate threshold value,
   wherein the new image is assigned to the burst when the similarity distances between the new image and other images in the burst are below the burst threshold value.

3. The system of claim 1, further comprising instructions executable by the processor to:
   sequence the images in a chronological sequence, wherein the similarity distances are calculated between adjacent images in the chronological sequence.

4. The system of claim 1, wherein the images are grouped into a burst based further on at least one of image capture times or image capture locations.

5. The system of claim 1, wherein the images are automatically grouped into the burst further based on image compositions, facial expressions, orientations of the faces, sizes of the faces, light exposures of the faces and persons in the image, importance of person(s) in the image, scene composition, dominant colors, color histograms, block color histograms, or cloth colors and patterns.

6. The system of claim 1, further comprising instructions executable by the processor to:
   automatically calculate a Hamming Distance between hash values of the first image and the second image to calculate similarity distances between the images.

7. The system of claim 6, wherein the hash values of the first image and the second image are calculated by a hashing method including pHash, Radial-Hash, or Wavelet-based hash.

8. The system of claim 1, wherein the computing system further comprises a photo selection module, the system further comprising instructions executable by the processor to:
   automatically select at least one image from the burst of images by the photo selection module.

9. The system of claim 8, further comprising instructions executable by the processor to:
   discard the duplicate image before selecting at least one image from the burst of images.

10. The system of claim 8, wherein at least one image is automatically selected from the burst of images based on detection of faces, faces recognized presence of faces of family and close friends, or positions and focus of the faces in the image.

11. The system of claim 8, wherein the computing system further comprises an intelligent design creation engine, the system further comprising instructions executable by the processor to:
   automatically create a photo product design using the selected image from the burst by the intelligent design creation engine.

12. The system of claim 11, further comprising instructions executable by the processor to:
   automatically display the selected image from the burst on a device by the intelligent design creation engine.

13. The system of claim 11, further comprising instructions executable by the processor to:
   automatically select a product type, a product layout, or a product style for the photo product design by the intelligent design creation engine.

14. The system of claim 11, further comprising instructions executable by the processor to:
   automatically present multiple images in a burst by the intelligent design creation engine for user selection of a different image from the burst in the photo product design or the photo display.

15. A system for reducing similar photos comprising:
   a computing system operating on a mobile device comprising at least one processor communicatively connected to a memory, the memory storing computer-executable instructions that when executed cause the facial expression recognition system to:
      calculate hash values of images by a similarity distance computation module in the computer system, wherein the images includes a first image and a second image;
      calculate similarity distances between the images using at least the hash values by a similarity distance computation module in the computer system configured to calculate differences in color densities, edge orientations, or edge densities between the images; and
      automatically group the images into a burst based at least in part on the similarity distances of the images by a burst grouping module in the computer system.

16. The system of claim 15, wherein the images are grouped into the burst when the similarity distances of the images are below a burst threshold value.

17. The system of claim 15, further comprising instructions executable by the processor to:
   automatically select at least one image from the burst of images.

18. The system of claim 17, further comprising instructions executable by the processor to:
   discard the duplicate image before selecting at least one image from the burst of images.

19. The system of claim 17, further comprising instructions executable by the processor to:
   automatically create a photo product design using the selected image from the burst by an intelligent design creation engine in the computer system.

20. The system of claim 19, wherein the computing system further comprises a product type library, a product style library, and a product layout library, and wherein the photo product design is based in part on product types, product styles, and product layouts stored in the product type library, the product style library, and the product layout library.

* * * * *